United States Patent [19]

Chambers et al.

[11] 4,425,825
[45] Jan. 17, 1984

[54] GEARED INPUT MECHANISM FOR A TORQUE CONVERTER

[75] Inventors: Robert O. Chambers, Peoria; Marion E. Ogden, Morton, both of Ill.

[73] Assignee: Caterpillar Tractor Co., Peoria, Ill.

[21] Appl. No.: 262,961

[22] PCT Filed: May 12, 1980

[86] PCT No.: PCT/US80/00550
§ 371 Date: May 12, 1980
§ 102(e) Date: May 12, 1980

[87] PCT Pub. No.: WO81/03365
PCT Pub. Date: Nov. 26, 1981

[51] Int. Cl.³ .............................................. F16H 1/28
[52] U.S. Cl. ...................................... 74/804; 74/390; 74/803; 74/801; 74/411
[58] Field of Search ................. 74/797, 801, 804, 805, 74/390, 411, 413, 803

[56] References Cited

U.S. PATENT DOCUMENTS

| 526,360 | 9/1894 | Belanger | 74/413 |
|---|---|---|---|
| 1,021,233 | 3/1912 | Beach et al. | 74/805 |
| 1,235,047 | 7/1917 | Nikonow | 74/805 |
| 1,836,555 | 12/1931 | Ryder | 74/805 |
| 1,836,587 | 12/1931 | Godfrey | 74/413 |
| 1,836,602 | 12/1931 | King | 74/413 |
| 1,848,435 | 3/1932 | Richards | 74/413 |
| 1,942,794 | 1/1934 | Benson | 74/805 |
| 1,942,795 | 1/1934 | Benson | 74/805 |
| 1,942,796 | 1/1934 | Benson | 74/805 |
| 3,002,593 | 10/1961 | Black et al. | 192/3.2 |
| 3,006,199 | 10/1961 | Christenson et al. | 74/730 |
| 3,240,308 | 3/1966 | Frost | 192/103 |
| 3,427,901 | 2/1969 | Wildhaber | 74/804 |
| 4,070,926 | 1/1978 | Schneider et al. | 74/730 |

FOREIGN PATENT DOCUMENTS

| 59518 | 2/1942 | Denmark | 74/730 |
|---|---|---|---|
| 672995 | 2/1939 | Fed. Rep. of Germany | 74/730 |
| 1096143 | 12/1960 | Fed. Rep. of Germany | 74/730 |
| 645352 | 10/1928 | France | 74/805 |

Primary Examiner—Lawrence J. Staab
Assistant Examiner—Joseph M. Rolnicki
Attorney, Agent, or Firm—Charles E. Lanchantin, Jr.

[57] ABSTRACT

A drive apparatus (10) includes a drive member (11) and a connected driving ring gear (23) rotatable about a first axis (21) for supplying power to a torque converter (13). A compact speed change mechanism (16) interconnects the driving ring gear (23) and torque converter (13) and includes a driven ring gear (25) connected to the torque converter, and a support device (17,20,32,50). The support device (17,20,32,50) rotatably supports the driven ring gear (25) on a second axis (27) offset from the first axis (21), and the meshed ring gears (23,25) have a preselected tooth differential to effect a speed change therebetween. The support device includes a support member (17) having a portion (18) journalled in the drive member (11), and an arm (50) on the support member is rotationally fixed while it is allowed to have a preselected amount of play movement.

18 Claims, 2 Drawing Figures

GEARED INPUT MECHANISM FOR A TORQUE CONVERTER

DESCRIPTION

1. Technical Field

This invention relates generally to gearing, and more particularly to a compact mechanism for effecting a speed change of the input drive to a torque converter.

2. Background Art

In many vehicle power trains the output end of the engine is closely coupled to the input end of a transmission. Since a hydrodynamic torque converter is located at the front end of many power shaft transmissions, this places the engine flywheel or other engine output member in closely disposed proximity to the input member of the torque converter.

Furthermore, it can be appreciated that it is sometimes difficult to correctly match the output speed and performance of a particular engine with the operating characteristics of one torque converter or a relatively limited number of different sized torque converters. Rather than increasing the size of the torque converter in order to better match a given engine, which can be a relatively costly solution, it has been found desirable to increase the speed of the input member that drives that torque converter. Such a change in the input speed can be accomplished by utilizing a conventional transfer gear system between the driving engine and the driven torque converter, but this can be an excessively costly solution.

Still another problem arises in many power trains wherein the amount of available space is limited for providing either a transfer gear system of conventional construction or an increased size torque converter. This is especially true for vehicle drive power trains where space is at a premium.

Therefore, what is needed is a compact and economical mechanism for speeding up or slowing down the input drive to a torque converter from a driving power source of preselected physical characteristics. For example, speeding up the input member of a torque converter by only about 10 to 15% can obviate the need for a torque converter of greater capacity of can result in a much improved vehicle operating efficiency.

DISCLOSURE OF INVENTION

In accordance with one aspect of the present invention a drive apparatus of the type having a driving ring gear rotatable about a first axis and a driven torque converter, includes a speed change mechanism having a driven ring gear connected to the torque converter, and support means for rotatably supporting the driven ring gear on a second axis offset from the first axis, and with the ring gears being in meshed engagement and having a preselected tooth differential for effecting a speed change therebetween.

In accordance with another aspect of the present invention an improved drive apparatus is provided including a speed change mechanism for increasing the input speed to a torque converter without utilizing a complex transfer gear arrangement at the input thereof. The speed change mechanism is desirably arranged to occupy a minimum volume. While a speed-up geared input mechanism is disclosed, the present invention is also applicable to reducing the input speed to a torque converter member.

More specifically, the invention comprehends providing a drive apparatus having a driving member rotatable about a first axis, a torque converter having a rotatable input member, and a speed change mechanism. The speed change mechanism includes a support member having first and second portions, a driving ring gear rotatable coaxially with the driving member, and wherein the first portion of the support member is journalled in the driving member on the first axis. Retaining means are provided for preventing rotation of the support member, and a bearing assembly on the second portion of the support member defines a second axis spaced parallel to the first axis. A driven ring gear is rotatably carried by the bearing assembly and is meshed with the driving ring gear, and the driven gear is drivingly connected to the converter input member.

In the illustrated embodiment, the retaining means permits a small amount of play of the support member relative to the housing. The retaining means includes a fixed support and a link pivotally connected to an arm portion of the support member, and pivotally connected to the fixed support.

In the illustrated embodiment, the driving ring gear is mounted on a flywheel connected to an engine crankshaft, and the driven ring gear is smaller than the driving ring gear and defines therewith a crescent-shaped clearance space therebetween. The retaining means can comprise an arm formed integrally with the support member and extending radially therefrom and axially through the crescent-shaped clearance space between the ring gears. A link can be pivotally connected to the arm and to a fixed support for preventing rotation of the support member.

The drive apparatus of the present invention is simple and economical in construction while yet providing a highly improved speed increaser or speed reducer for driving a torque converter in a structure requiring a minimal increase in the size thereof.

BEST MODE FOR CARRYING OUT THE INVENTION

Figure 1:
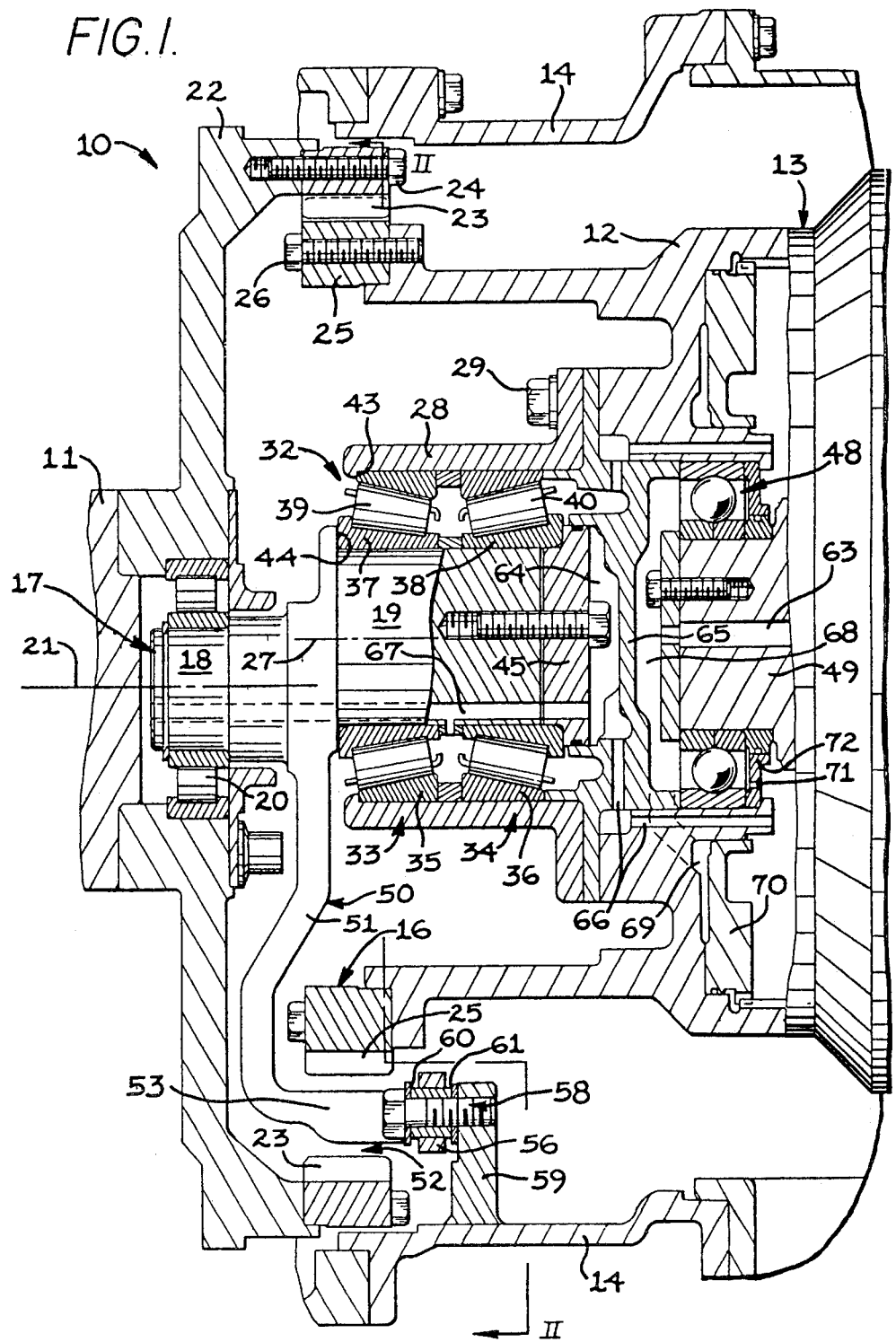
FIG. 1 is a fragmentary, diagrammatic, diametrically sectioned, elevational view of a drive apparatus illustrating an embodiment of the speed change mechanism of the present invention.

In the illustrative embodiment of the invention as disclosed in the drawings, a drive apparatus generally designated 10 is provided for connecting an independently rotatably supported engine drive member or crankshaft 11 to the input member 12 of a hydrodynamic torque converter 13. The torque converter can be of conventional construction such as having the usual impeller input element, reaction element, and turbine output element therein (not shown). For example, U.S. Pat. No. 3,002,593 to J. B. Black, et al on Oct. 3, 1961 and U.S. Pat. No. 3,240,308 to B. L. Frost on Mar. 15, 1966 represent torque converter constructions of the type generally referred to and which are incorporated herein by reference. The drive apparatus 10 is enclosed in an outer housing 14 as is fragmentarily illustrated in FIG. 1.

The invention includes a speed change mechanism generally designated 16 for effecting a speed change of the input drive to the torque converter 13. The illustrated mechanism advantageously increases the input drive speed to the torque converter and thus avoids the need for a more complex transfer gear system or for a torque converter of larger size. More specifically, the speed change mechanism 16 includes a support device or member 17 defining a first cylindrical portion 18 and a second cylindrical portion 19. The first portion 18 is journaled or supported in a bearing assembly 20 carried by the crankshaft 11 or associated flywheel 22 connected thereto. Thus, the first portion of the support member is positioned coaxially of a first axis 21 defining the axis of rotation of the crankshaft. The engine crankshaft is supported in a conventional manner by bearings, not shown, and has the usual degree of radial motion.

Preferably, an internally toothed, first ring gear 23 is releasably secured to the flywheel 22 by a plurality of bolts 24. A complementary externally toothed, second ring gear 25 is in localized meshing engagement with the ring gear 23 and is releasably secured to the input member 12 of the torque converter 13 by a plurality of bolts 26. Advantageously, the second ring gear 25 and the input member 12 are supported on the second portion 19 of the support member 17 for rotation about a second axis 27 disposed in preselected offset, but parallel relation to the first axis 21.

A tubular drive support member 28 is releasably secured to the input member 12 as by bolts 29. A double tapered, second bearing assembly 32 is coaxially mounted on the second portion 19 of the support member 17 for rotatably supporting the tubular drive support member 28 and thus the input member 12 of the torque converter on the second axis 27.

More particularly, the second bearing assembly 32 includes an opposed pair of tapered roller bearing sets 33 and 34 having first and second outer races 35 and 36, first and second inner races 37 and 38, and first and second pluralities of tapered roller elements 39 and 40. The outer races 35, 36 are axially retained securely in position by a retaining flange 43 on the tubular drive support member 28, and the inner races 37, 38 are axially retained securely between an annular shoulder 44 on the second portion 19 of the support member 17 and an end cap 45 releasably secured thereto.

As further shown in FIG. 1, a third bearing assembly 48 is provided within the input member 12 to rotatively support another member 49 of the torque converter 13 on the axis 27, such as the turbine output shaft thereof.

Support member 17 is effectively retained against rotation with the crankshaft 11 and the flywheel 22 by retaining means 50 including an arm 51 extending radially from the support member intermediate portions 18 and 19. As shown best in FIG. 2, the diameter of the external ring gear 25 is slightly smaller than the diameter of internal ring gear 23 so as to define a crescent-shaped clearance space 52 therebetween. Arm 51 includes an axially extending distal end portion 53 extending through the clearance space.

Figure 2:
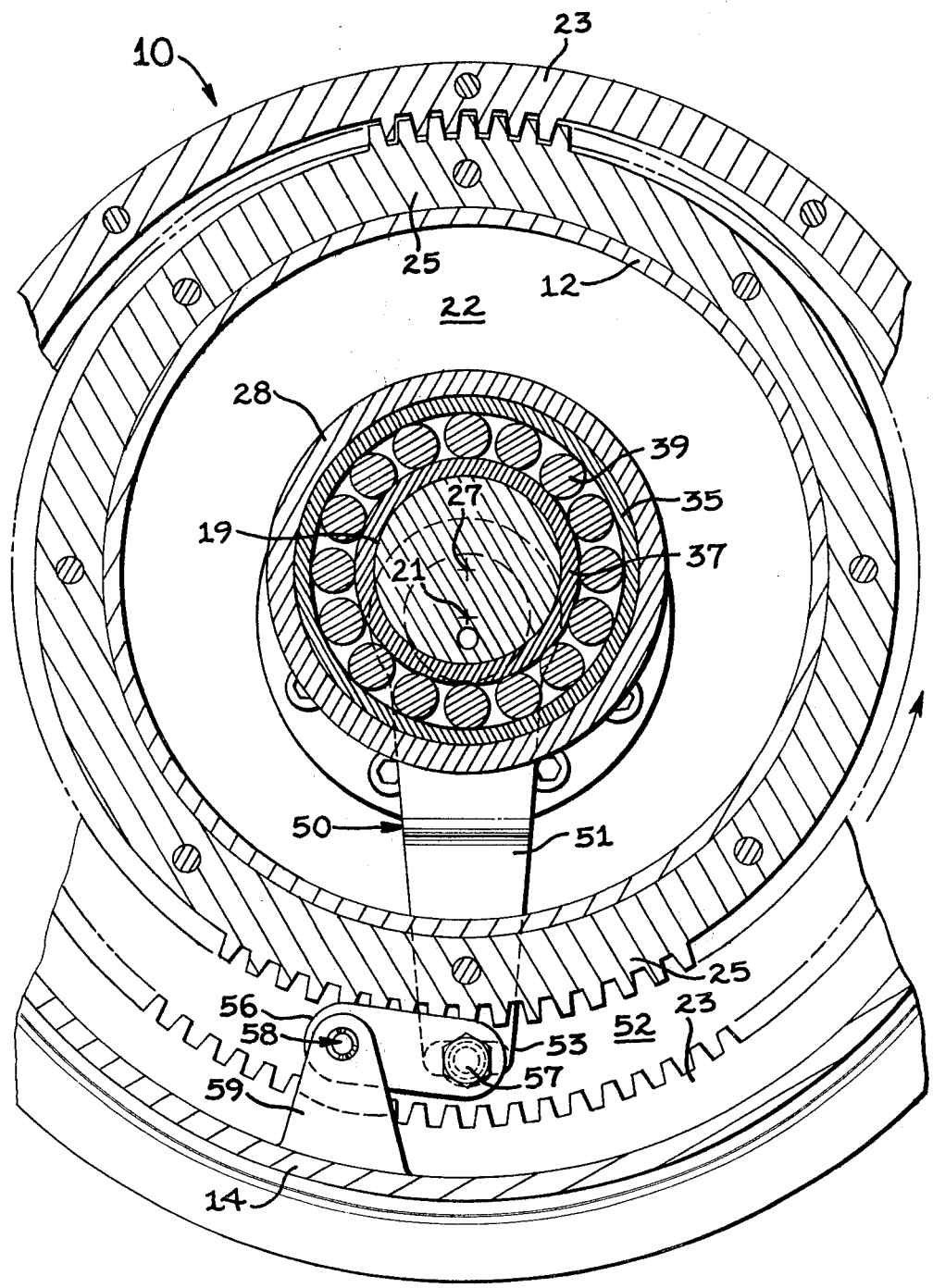
FIG. 2 is a fragmentary, diagrammatic, transverse sectional view taken substantially along line II—II of FIG. 1.

A link 56 is pivotally connected to the distal end portion 53 of the arm 51 by a pivot pin 57 as shown in FIG. 2. The opposite end of the link is pivotally anchored to a coupling assembly generally designated 58 as best shown in FIG. 1. The coupling assembly 58 is connected to the housing 14 via an upstanding support post 59, and it is to be noted that the link 56 has a preselected amount of axial movement on the coupling assembly 58 between first and second shoulders 60, 61 thereof. Thus, as shown, the retaining means 50 effectively prevents rotation of the support member 17 while allowing limited axial and radial play movement thereof relative to the housing 14.

A first lubrication distribution chamber 64 is defined between the end cap 45 and a recessed dividing wall member 65 connected to the input member 12. Lubricating fluid enters the chamber via passages 66 and exits therefrom via passages 67 to lubricate the first and second bearing assemblies 20, 32. The dividing wall member defines with the turbine output shaft 49 a second fluid distribution chamber 68 for subsequent fluid routing to a lock-up clutch actuation chamber 69. When chamber 69 is fully pressured via a fluid distribution passage 63 and the chamber 68, an annular actuating piston 70 will move to the right when viewing the drawing to connect the input member 12 directly to the turbine output shaft 49 through a conventional clutch pack, not shown, and to effectively by-pass normal fluid operation of the torque converter 13 in a well known manner. In order to assure lubrication of the third bearing assembly 48 when the lock-up clutch actuation chamber is not pressurized, a plurality of lubrication ports 71 are provided in an annular sealing ring 72 to permit fluid to pass to the left when viewing FIG. 1 from a continuously pressurized separate source, not shown.

INDUSTRIAL APPLICABILITY

The driving input ring gear 23 meshes generally at one peripheral location with the driven ring gear 25 so as to provide the desired speed increase to the torque converter input member 12. Thus, the drive apparatus 10 is advantageously adapted for use in drive systems, such as in vehicle drive systems, wherein increased rpm is desired to drive a torque converter at a higher rate of speed without the use of a more complex conventional transfer gear arrangement and without increasing the size of the torque converter.

Advantageously, the complementary ring gears 23 and 25 have different diameters and a preselected difference in the number of teeth thereof to obtain a specific increase in speed, for example a speed increase of about 10 to 15% above engine speed. By manipulating the number of teeth in these two gears and the preselected distance between the axes 21 and 27, as determined by the constructions of the cylindrical portions 18, 19 of the support member 17, a large range of speed changes can be conveniently effected.

As the housing 14 is maintained relatively small, the cost of the drive apparatus is effectively minimized while, at the same time, permitting its size to be maintained compact for facilitated vehicle installation.

We also contemplate that the drive apparatus 10 can be used for speed reduction purposes. This is conveniently achieved by converting the driving input internal ring gear 23 and the driven external ring gear 25 to a driving input external ring gear and a driven internal ring gear respectively at the same general location and with the same general offset axis bearing support system as discussed above.

Other aspects, objects and advantages of this invention can be obtained from a study of the drawings, the disclosure and the appended claims.

What is claimed is:

1. In a drive apparatus (10) of the type having a housing (14), an engine flywheel member (22) and a driving ring gear (23) jointly rotatable in the housing (14) about a first axis (21), and a torque converter (13) driven thereby, a speed change mechanism (16) comprising:
- a driven ring gear (25) connected to said torque converter (13); and
- support means (17,20,32,50) for rotatably supporting said driven ring gear (25) on a second axis (27) offset from said first axis (21), said ring gears (23,25) being in meshed engagement and having a preselected tooth differential to effect a speed change therebetween, and wherein said support means (17,20,32,50) includes a support member (17), a bearing assembly (20) connected between the support member (17) and the flywheel member (22), and retaining means (50) for preventing rotation of the support member (17) while allowing limited axial and radial play movement thereof relative to the housing (14).

2. The drive apparatus (10) of claim 1 wherein said torque converter (13) has an input member (12) connected to said driven ring gear (25), and wherein said support means (17,20,32,50) includes another bearing assembly (32) connected generally between said support member (17) and said input member (12).

3. The drive apparatus (10) of claim 1 wherein said driving ring gear (23) is an internal ring gear, said driven ring gear (25) is an external ring gear, said gears (23,25) define a crescent-shaped clearance space (52) therebetween, and said retaining means (50) extends through said clearance space (52) and is connected to the housing (14).

4. The drive apparatus (10) of claim 1 wherein said support member (17) has first and second cylindrical portions (18,19), and said bearing assembly (20) journals said first cylindrical portion (18) generally in said flywheel member (22).

5. The drive apparatus (10) of claim 4 wherein said torque converter (13) has an input member (12) connected to said driven ring gear (25), and said support means (17,20,32,50) includes another bearing assembly (32) on said second cylindrical portion (19) of a construction sufficient for rotatably supporting said input member (12).

6. The drive apparatus (10) of claim 5 wherein said another bearing assembly (32) includes an opposed pair of tapered roller bearing sets (33,34).

7. The drive apparatus (10) of claim 1 wherein said retaining means (50) includes an arm (51) and a link (56), said arm (51) extending axially outwardly between said ring gears (23,25), and said link (56) being pivotally connected to said arm (51) and to said housing (14).

8. In a drive apparatus (10) having an engine flywheel member (22) rotatable about a first axis (21), and a torque converter (13) having a rotatable input member (12), a speed change mechanism (16) comprising:
- a driving ring gear (23) connected to said flywheel member (22);
- support member (17) having first (18) and second (19) portions;
- a first bearing assembly (20) connected to the flywheel member (22) and supporting said first portion (18) of the support member (17);
- retaining means (50) for preventing rotation of said support member (17) about said first axis (21) while allowing limited axial and radial play movement thereof;
- a second bearing assembly (32) on said second portion (19) of the support member (17) defining a second axis (27) spaced generally parallel to said first axis (21); and
- a driven ring gear (25) rotatably carried by said second bearing assembly (32) and meshed with said driving ring gear (23), said driven ring gear (25) being drivingly connected to said converter input member (12).

9. The drive apparatus (10) of claim 8 including a fixed support (59) and wherein said retaining means (50) includes a link (56) pivotally connected at one end to said support member (17) and at the opposite end to said fixed support (59).

10. The drive apparatus (10) of claim 13 wherein said support member (17) includes an arm (51) extending radially of said first axis (21), and said link (56) is pivotally connected at said one end to said arm (51).

11. The drive apparatus (10) of claim 10 wherein said driving ring gear (23) is an internal ring gear and said driven ring gear (25) is an external ring gear.

12. The drive apparatus (10) of claim 11 wherein said external ring gear (25) has a diameter less than that of said internal ring gear (23) to define a crescent-shaped clearance space (52) therebetween, said arm (51) extending through said clearance space (52).

13. The drive apparatus (10) of claim 8 wherein said second bearing assembly (32) includes an opposed pair of tapered bearing sets (33,34).

14. In a drive apparatus (10) having an engine flywheel member (22) rotatable about a first axis (21) and a torque converter (13) having a rotatable input member (12), a speed change mechanism (16) comprising:
- a support member (17) having first and second portions (18,19);
- an internally toothed driving ring gear (23) connected coaxially to said flywheel member (22);
- a first bearing assembly (20) journaling said first portion (18) of the support member (17) within said flywheel member (22) coaxially of said first axis (21);
- retaining means (50) for preventing rotation of said support member (17) about said first axis (21) while allowing limited axial and radial play movement thereof;
- a second bearing assembly (32) on said second portion (19) of the support member (17) defining a second axis (27) spaced generally parallel to said first axis (21); and
- an externally toothed driven ring gear (25) rotatably carried by said second bearing assembly (32) and meshed with said driving ring gear (23), said driven ring gear (25) being drivingly connected to said converter input member (12).

15. The drive apparatus (10) of claim 14 including another torque converter member (49) and a third bearing assembly (48) mounted coaxially of said second axis (27) and rotatably carrying said another torque converter member (49).

16. The driven apparatus (10) of claim 14 wherein said first and second portions (18,19) of the support member (17) are axially offset cylindrical portions thereof.

17. The drive apparatus (10) of claim 18 wherein said first bearing assembly (20) includes a roller bearing.

18. The drive apparatus (10) of claim 17 wherein said second bearing assembly (32) includes an opposed pair of tapered roller bearing sets (33,34).

* * * * *